United States Patent

Heanue et al.

Patent Number: 5,450,218
Date of Patent: Sep. 12, 1995

[54] METHOD FOR ENCODING AND DECODING DIGITAL DATA IN HOLOGRAPHIC STORAGE MEDIA

[75] Inventors: John F. Heanue, San Mateo; Matthew C. Bashaw, Menlo Park; Lambertus Hesselink, Woodside, all of Calif.

[73] Assignee: Board of Trustees of the Leland Stanford Junior University, Stanford, Calif.

[21] Appl. No.: 286,480

[22] Filed: Aug. 4, 1994

[51] Int. Cl.$^6$ .............................................. G02B 5/32
[52] U.S. Cl. ..................................... 359/21; 359/10; 359/22; 365/125; 369/103
[58] Field of Search .................... 359/10, 11, 21, 22, 359/24, 25, 28, 32; 365/125, 216, 234, 235; 369/102, 103, 275.1, 283, 284, 286; 371/6, 67.1

[56] References Cited

U.S. PATENT DOCUMENTS

| | | | |
|---|---|---|---|
| 3,614,191 | 10/1971 | Sakaguchi et al. | 359/11 |
| 3,871,740 | 3/1975 | Matsubara et al. | 359/21 |
| 4,318,581 | 3/1982 | Guest et al. | 359/21 |
| 5,121,228 | 6/1992 | Paek | 359/7 |

*Primary Examiner*—Loha Ben
*Assistant Examiner*—Darren E. Schuberg
*Attorney, Agent, or Firm*—Thomas J. McFarlane

[57] ABSTRACT

A method for encoding and decoding digital data for storage in a holographic medium (12). Digital data, consisting of binary data ($B_i$) or grey scale data ($A_i$), is encoded in bit groups or digit groups ($B_k$, $A_k$) containing at least k=1 bits or digits, respectively, by assigning to each bit group ($B_k$) one reference bit ($B_r$) and to each digit group ($A_k$) two reference digits ($A_{r1}$, $A_{r2}$), assigning the bits of group ($B_k$) to information bits ($B_j$), assigning the digits of group ($A_k$) to information digits ($A_j$), assigning the reference bit ($B_r$) and information digits ($B_j$) to a reference pixel ($P_r$) and information pixels ($P_j$) chosen from pixels (24) of a holographic signal modulator (18), and assigning the reference digits ($A_{r1}$, $A_{r2}$) and information digits ($A_j$) to reference pixels ($P_{r1}$, $P_{r2}$) and information pixels ($P_j$) chosen from pixels (24) of the holographic signal modulator (18). Storing all pixels (24) by illuminating the holographic signal modulator (18) with a signal beam (22) which impresses upon the signal beam (29) pixels (24), guiding the signal beam (22) to the holographic medium (12) and storing the pixels (24) by directing a reference beam (26) at the holographic medium (12) from a predetermined angle $\beta$ and at a predetermined part of the holographic medium (12). Decoding the encoded binary data ($B_i$) and encoded grey scale data ($A_i$) by aiming the reference beam (26) at the holographic medium (12) at the same angle $\beta$ and location as during storage, recovering pixels (24) and recovering from them using a decoding unit (38) reference bits ($B_r$) and information bits ($B_j$) for each bit group ($B_k$), and recovering reference digits ($A_{r1}$, $A_{r2}$) and information digits ($A_j$) for each digit group ($A_k$). Reconstructing the original binary data ($B_i$) by differentiating the binary values of bits ($B_r$) and ($B_j$). Reconstructing the grey scale data ($A_i$) by differentiating the reference digits ($A_{r1}$, $A_{r2}$) to obtain a benchmark ($D_r$) and applying a binary operation on the benchmark ($D_r$) and each of the information digits ($A_j$).

27 Claims, 2 Drawing Sheets

METHOD FOR ENCODING AND DECODING DIGITAL DATA IN HOLOGRAPHIC STORAGE MEDIA

This invention was made with Government support under contract no. N00014-92-J-1903, awarded by the Advanced Research Projects Agency (ARPA).

BACKGROUND—FIELD OF THE INVENTION

The present invention relates to the field of holographic storage of information, and in particular to a method of encoding digital information for storage in holographic media and a method for decoding that information during retrieval.

BACKGROUND—DESCRIPTION OF PRIOR ART

Since the development of off-axis holography in the sixties, volume holography has been identified as a candidate for high density data storage. Theoretically, up to $10^{14}$ bits of information can be stored in 1 cm$^3$ of a holographic medium. In addition, holographic storage promises fast data transfer rates, estimated at over 1 gigabit/sec, and extremely short access times. That is because thousands of bits of data are stored together on individual holographic images called holographic pages. Such pages of data are stored and retrieved at once by the optical apparatus, thus enabling quick access to the data.

Unfortunately, no suitable method for storing digital data in holographic media has been devised to date. In fact, prior arrangements are typically restricted to storing analog data. Such data includes images and pictorial information which can be stored and retrieved for viewing purposes rather than data processing.

Meanwhile, the quality of digital data stored on holographic pages as individual bits is poor. This is due to many adverse factors. Some of these include uncontrolled and time-dependent fluctuations in light intensity throughout the volume of the holographic medium and from page to page, decreasing signal to noise ratio with increasing number of pages stored, unpredictable variations in the complex index of refraction causing poor light diffraction and thus poor image quality and other time-dependent noise.

Because of these variations in light intensity it is very difficult to determine whether a bit stored in a particular region of a page is a zero, corresponding to a dark pixel on the page, or a one, corresponding to a light pixel. The current method of setting a threshold intensity level above which a pixel is considered a one leads to many misidentifications especially when many pages are recorded. This, in turn, translates into a loss of bits in all page regions where the intensity level varies in a nonuniform manner. The unacceptably high bit error rates (BER) resulting from these losses render the data useless for processing.

The problem is even more deeply felt in storing grey scale data. A grey scale data digit can assume a number of discrete values. In holographic media these discrete values would be translated into discrete intensity levels. However, the uncertainty in page-to-page light intensity and light intensity fluctuations in different regions of the same page render storing such data in holographic media virtually impossible.

There exist intensity compensation techniques for adjusting to different light intensity levels. These techniques are based on sampling a small number of pixels in a given region of a page to determine an intensity correction factor for that region. This correction factor is then added to the threshold value for determining the intensity level of data pixels. Unfortunately, such compensation techniques do not work well in holographic media because the intensity fluctuations are also time-dependent.

In sum, prior art techniques are not capable of storing digital data in holographic media in an efficient and reliable manner. Moreover, the error correction and compensation techniques currently used are at best effective in treating analog, pictorial data.

OBJECTS AND ADVANTAGES OF THE INVENTION

In view of the above, it is an object of the present invention to provide a reliable encoding method for storing digital data in a holographic medium and a decoding method for decoding digital data stored in such manner. In particular, the encoding method of the invention provides for accurate storage and retrieval of binary and grey scale data by virtue of being insensitive to time-dependent noise, page-to-page intensity fluctuations and region-to-region intensity fluctuations on the same page. It is another object of the invention to provide an encoding method with increases the capacity of holographic media and enables better use of error correction codes.

These and other objects and advantages will become more apparent after consideration of the ensuing description and the accompanying drawings.

SUMMARY OF THE INVENTION

Surprisingly, it has been found that digital data intended for storage in holographic media can be encoded and decoded in bit groups, when dealing with binary data, or digit groups, when dealing with grey scale data. For binary data each bit group is assigned a binary reference bit which is coded in a reference pixel of a holographic signal modulator, and information bits which preferably contain the bits to be coded are assigned to information pixels of the same modulator. By illuminating the pixels with a signal beam which is guided to the holographic medium and simultaneously aiming a reference beam from a certain angle and at a certain part of the holographic medium the data contained in the reference pixels and information pixels is stored in the holographic medium.

In encoding grey scale data two reference pixels are assigned and coded for each digit group in addition to information digits preferably containing each digit of the digit group. Then the pixels are stored in the holographic medium.

To recover stored data the signal beam is turned off and the reference beam is aimed at the holographic medium at the same angle and location as during storage. This causes an image beam to issue forth from the holographic medium. The image beam is projected on a projection device, preferably a charge-coupled device, which is sensitive to and images the stored pixels.

A decoding unit is used to identify the reference pixels and information pixels corresponding to the bit groups and/or data groups. In decoding a bit group the decoding unit assign to the identified reference pixel the reference bit and to information pixels the information bits and differentiates each information bit with the reference bit to recover the original binary data. Preferably, the differentiation operation is subtraction.

In decoding digit groups the two reference digits are recovered from the two reference pixels and the information digits are recovered from the information pixels. The decoding unit constructs a benchmark or reference by differentiating the two reference digits and reconstructs the original grey scale data by performing a binary operation on each information digit and the benchmark. In a preferred method the differentiation operation is subtraction and the binary operation is multiplication.

DESCRIPTION

Figure 1:
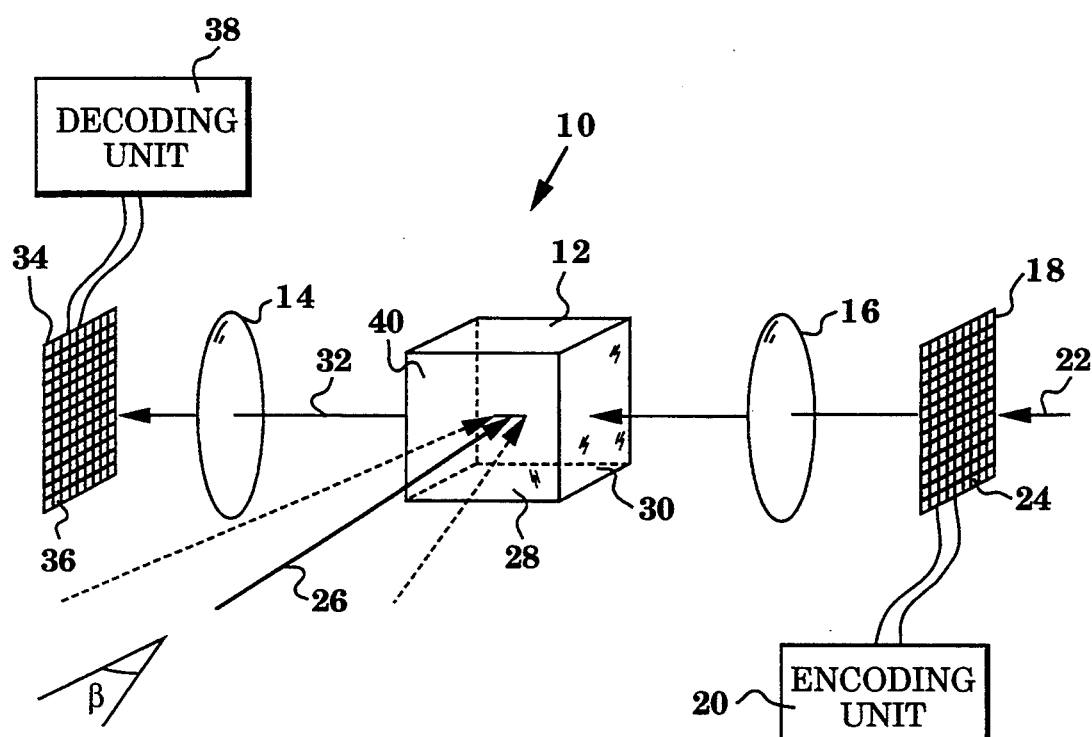
FIG. 1 is a three dimensional view of an optical arrangement used to encode and decode digital data in a holographic medium according to the method of the invention.

FIG. 1 shows an optical arrangement 10 for practicing the method according to the invention to encode and decode digital data. Optical arrangement 10 includes a holographic medium 12 in the form of a cubically shaped photorefractive crystal. In the present embodiment the dimensions of the crystal are approximately 2 cm×1 cm×1 cm and the crystal is made of $LiNbO_3$ doped with iron. However, the dimensions of medium 12 are not geometrically restricted to any particular form or size and neither is its composition. In principle, any number of holographic recording media, e.g., holographic glass, can be used as medium 12. The only restriction is that these media be capable of diffracting light to reproduce a stored holographic image, as discussed below.

Optical units 14 and 16 are located to the left and right of medium 12. Units 14 and 16 are single optical lenses or groups of lenses capable of focussing, collimating, and guiding electromagnetic radiation to medium 12. Additional elements such as shutters, diaphragms, and irises can also be included.

A holographic signal modulator or spatial light modulator (SLM) 18 is positioned to the right of unit 16. SLM 18 is connected to an encoding unit 20 for encoding digital data. Unit 20 contains microprocessor units and all relevant data processing assemblies well known in the art. In the present embodiment SLM 12 is a liquid crystal array with 480×440 pixels 24 capable of being tuned to various levels of transmissivity to a signal beam 22. Of course, other modulating devices capable of selectively passing or blocking corresponding portions (pixels) of signal beam 22 can be used with equal success.

The transmissivity of pixels 24 to signal beam 22 is controlled by encoding unit 20. Unit 20 is preferably a digital signal processor capable of performing encoding operations on digital data. By controlling the transmissivity of pixels 24, unit 20 communicates the encoded digital data to SLM 18. In turn, the set transmissivities of pixels 24 of SLM 12 modulate signal beam 22 and impresses upon it the digital data encoded in pixels 24. In a preferred embodiment a pixel set to transmit the corresponding portion of signal beam 22, i.e., a bright pixel, corresponds to a one, and an opaque pixel set to block the corresponding portion of signal beam 22, i.e., a dim pixel, represents a zero. Intermediate intensities coding for values other than zero or one are also possible, e.g., for representing grey scale data.

A reference beam 26 is aligned with standard optical elements (not shown) to illuminate medium 12 on a front face 28. The angle of incidence $\beta$ of reference beam 26 on face 28 can be modulated over a wide range of angles using these optical elements. Preferably, the same optical elements can also alter the position where reference beam 26 is incident on face 28 as well as the size and geometry of the spot of beam 26. In principle, reference beam 26 can be incident on any face of medium 12 as long as it passes through it and produces enough interference to store data carried by signal beam 22, as explained below.

Meanwhile, optical unit 16 focuses signal beam 22 on a side face 30 of medium 12. According to known principles of holographic data storage, reference beam 26 and signal beam 22 interfere inside medium 12. This interference changes the complex index of refraction of individual portions of medium 12 thus storing the digital data encoded in pixels 24.

As is well known, data carried by signal beam 22 can be stored in medium 12 under various parameters of reference beam 26. For example, reference beam 26 can be directed at different positions s of front face 28 and at different angles of incidence $\beta$ to it or at output face 40. Thus, every successive set or group of data corresponding to the array of pixels 24 is stored under different reference beam parameters s and $\beta$. Each such group of data is called a holographic page $H_i$.

At each position s angle $\beta$ is multiplexed over its allowable range to store a certain number $N_a$ of holographic pages $H_i$. Diffraction efficiency of medium 12, which decreases as more pages $H_i$ are stored, restricts this number of holographic pages $N_a$ by decreasing the signal-to-noise ratio (SNR) for each successive page $H_i$. When the storage capacity at one position s is exhausted, a different position s is chosen. As with angle $\beta$, the number of positions s at which the storage process can be repeated is also limited to a certain value $N_s$. Thus, the total number of pages $H_i$ which can be stored in medium 12, $N_T = N_s \times N_a$, is dictated by the SNR at which the equipment used can still recognize the stored pages $H_i$.

To reconstruct pages $H_i$ stored in medium 12 signal beam 22 is turned off or blocked. Then, reference beam 26 is directed at medium 12 to the same position s on front face 28 and at the same angle of incidence $\beta$ as during data storage. This produces an image beam 32 which exits medium 12 through an output face 40. Optical unit 14, consisting of all appropriate optical elements, is located in the path of image beam 32 to shape and project it onto an imaging unit or charged-coupled device 34 (CCD). Similarly to SLM 18, CCD 34 has an array of pixels 36. Pixels 36 are sensitive to the light intensities at different projection points of image beam 32. Preferably, the number of pixels 36, their size, and their geometrical arrangement allow each pixel 24 of SLM 18 to be imaged to a pixel 36 or a known number of pixels 36. In one preferred embodiment, pixels 36 and pixels 24 are in a one-to-one correspondence. This ensures that each page $H_i$ of digital data encoded in pixels 24 is imaged directly onto corresponding pixels 36 of CCD 34.

A decoding unit 38 is connected to CCD 34. Unit 38 it set up to receive intensity data from each pixel 34 and recover from it the digital data encoded in pixels 24. Unit 38 is also programmed or wired to decode this digital data to recover the original data. The manner in which this is done is set forth below.

OPERATION—ENCODING

A preferred encoding method according to the invention is used to encode a set of binary data or data bits $B_i$ consisting of i individual bits. First, bits $B_i$ are delivered to encoding unit 20 shown in FIG. 1. In unit 20 bits $B_i$ are broken up into bit groups $B_k$ containing k bits. The size of each bit group can be different or the same. In one preferred embodiment all k values are the same. In fact, k=8 and each bit group $B_k$ represents a conventional byte. In another preferred embodiment k=480×440 and corresponds to the total number of pixels 24 of SLM 18. In this embodiment each bit group $B_k$ fits on one holographic page $H_i$.

Figure 7:
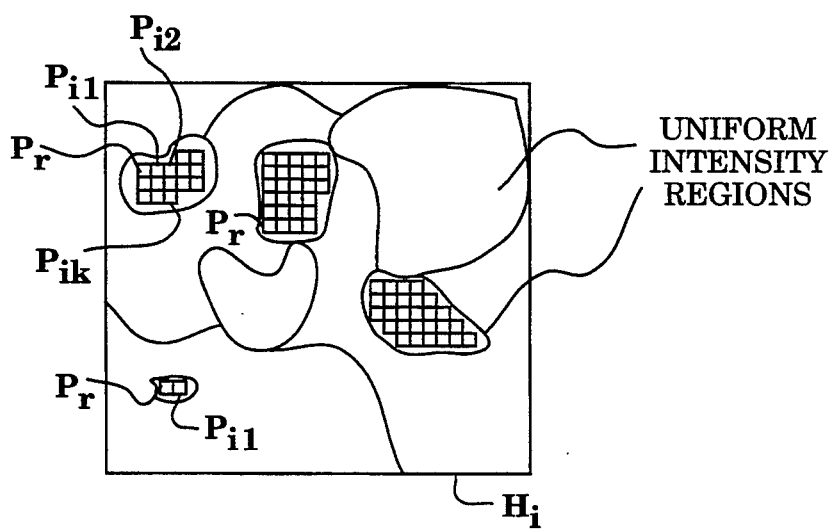
FIG. 7 is a front view of a holographic page subdivided into uniform intensity regions.

In a particularly advantageous embodiment number k is determined by the nonuniform intensity fluctuations found on each holographic page $H_i$. Preferably, each page $H_i$ is initially mapped and subdivided into multiple regions of uniform intensity or well-known intensity fluctuation pattern. This can be done with sampling techniques, e.g., sparse sampling, well known in the art. The number of pixels 24 which can be stored in one region of page $H_i$ depends on the size of that region. An example of how a particular page $H_i$ is subdivided into uniform intensity regions containing pixels 24 is shown in FIG. 7. The smallest region on page $H_i$ has to accommodate binary data represented by at least two pixels 24. Meanwhile, the shape of the region will depend on the geometry of the nonuniformity in medium 12 as projected on page $H_i$.

Once bits $B_i$ have been subdivided into bit groups $B_k$, each bit group is supplemented by a supplementary bit or reference bit $B_r$. For the sake of clarity, we will work with the smallest possible bit group $B_k$ which contains only one bit, i.e., k=1. Thus, the addition of reference bit $B_r$ creates k+1=2 bits.

The actual encoding step follows. In this case the one bit constituting $B_k$ is either equal to a binary zero or a binary one. In the first case encoding unit 20 assigns a one to $B_r$. Otherwise, when $B_k$ is one, unit 20 sets $B_r$ equal to zero. Next, unit 20 encodes the information represented by binary data in bit $B_k$ in an information bit $B_j$. In particular, if $B_k$ is zero unit 20 sets bit $B_j$ equal to zero, and if $B_k$ is equal to one then bit $B_j$ is assigned a one. Of course, the encoding can also be done in reverse, e.g., $B_k=0$ can be encoded as $B_r=0$; $B_j=1$, and $B_k=1$ can be encoded as $B_r=1$; $B_j=0$.

Figure 2:
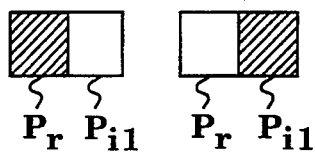
FIG. 2 is a schematic diagram illustrating the encoding method according to the invention for binary data.

Next, reference bit $B_r$ and information bit $B_j$ are assigned to a reference pixel $P_r$ and an information pixel $P_{i1}$ chosen from pixels 24 by unit 20. This is shown in FIG. 2, where the right portion of the figure shows how the transmissivities of pixels $P_r$ and $P_{i1}$ are set to encode $B_r=0$ and $B_j=1$. The left portion of the figure shows how pixels $P_r$ and $P_{i1}$ encode $B_r=1$ and $B_j=0$. (The hatching indicates that a pixel is opaque to light of signal beam 22 while a clear pixel is transparent to it.) The location of pixels $P_r$ and $P_{i1}$ on SLM 18 corresponds in position to the region of holographic page $H_i$ in which they are to be stored.

To store pixels $P_r$ and $P_{i1}$ signal beam 22 is passed through SLM 18 and modulated by the set transmissivities of pixels $P_r$ and $P_{i1}$. Then signal beam 22 passes through optical unit 16 and is incident on side face 30 of medium 12. Meanwhile, the proper holographic page $H_i$ for storing pixels $P_r$ and $P_{i1}$ is selected by choosing a corresponding choice of angle of incidence $\beta$ for reference beam 26. Once inside medium 12 signal beam 22 and reference beam 26 are allowed to interfere for a certain period of time and thus store pixels $P_r$ and $P_{i1}$. This time period is calculated according to known formulas and depends on the number of holographic pages already stored in medium 12.

Figure 3:
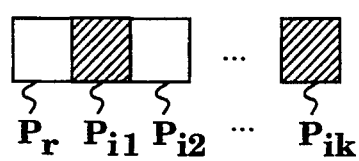
FIG. 3 is a schematic diagram showing a bit group encoded according to the invention.
Figure 4:
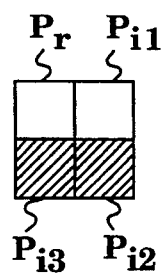
FIG. 4 is a schematic diagram showing an alternative method according to the invention for encoding a bit group.

Of course, bit groups $B_k$ with k>1 are heated analogously. FIG. 3 and FIG. 4 illustrate how larger bit groups $B_k$ are encoded in reference pixels $P_r$ and information pixels $P_{ik}$. In FIG. 3 the geometrical arrangement of pixels $P_r$, $P_{i1}$, . . . $P_{ik}$ is linear, corresponding to a linear portion of holographic page $H_i$ where these pixels will be stored. FIG. 4 shows a square arrangement of four pixels $P_r$, $P_{i1}$, $P_{i2}$, $P_{i3}$ encoding reference bit $B_r$ and three information bits $B_j$ of a bit group $B_k$ where k=3.

In a preferred method all pixels 24 are first subdivided into reference pixels $P_r$ and information pixels $P_{ik}$ corresponding to individual bit groups $B_k$ to be stored on a particular holographic page $H_i$. Then reference pixels $P_r$ are assigned the corresponding reference bits $B_r$ and information pixels $P_{ik}$ are assigned the corresponding information bits $B_j$.

Figure 5A:
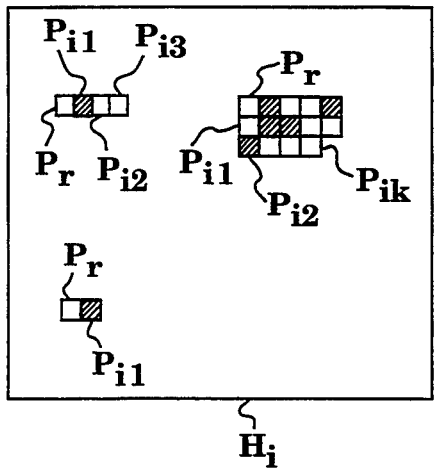
FIGS. 5A and 5B are schematic diagrams showing a bit group encoded and stored on several holographic pages according to the invention.

FIG. 5A illustrates how a number of groups $B_k$ is arranged on holographic page $H_i$ for storage. Once holographic page $H_i$ is prepared in this manner signal beam 22 through SLM 18 to store all pixels 24 in that page. This method allows to best utilize the memory space of medium 12.

Figure 5B:
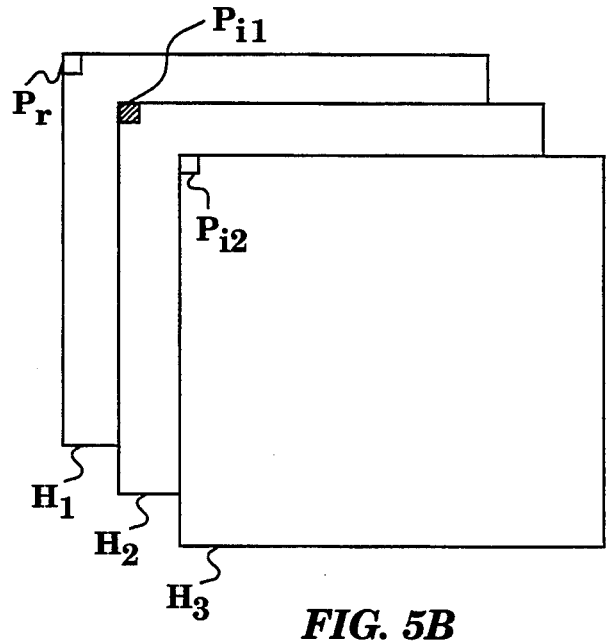

Alternatively, reference pixel $P_r$ and information pixels $P_{ik}$ encoding a particular bit group $B_k$ can be stored on different holographic pages $H_i$. This situation is best illustrated in FIG. 5B. Here, pixels $P_r$, $P_{i1}$, . . . $P_{ik}$ are stored in the same location on successive holographic pages $H_1$, $H_2$, . . . $H_k$. This technique is sometimes called shuffling. Clearly, shuffling is not limited to using successive pages or even the same location on each holographic page. This is true for all shuffling strategies in which encoding unit 20 and decoding unit 38 are capable of identifying the reference pixel $P_r$ and information pixels $P_{ik}$ for each encoded bit group $B_k$. Methods for doing this are well-known and are outside the scope of the present invention.

The encoding method used to encode grey scale data $A_i$ consisting of i digits is similar to the one described for binary data. First, after identifying a digit group $A_k$ of k digits, encoding unit 20 assigns a first reference digit $A_{r1}$ and a second reference digit $A_{r2}$ to that digit group $A_k$. In the preferred embodiment, first reference digit $A_{r1}$ is equated to the largest digital value which can be assumed by any one of digits $A_k$. Second reference digit $A_{r2}$ is given the lowest digital value which a digit $A_k$ is allowed to have. Of course, this order can be reversed.

Next, each digit $A_k$ is assigned an information digit $A_j$. In the most preferred embodiment these values are simply the digital values of digits $A_k$. Thus, at this point digit group $A_k$ is converted into two reference digits $A_{r1}$, $A_{r2}$ and k information digits $A_j$. Now, encoding unit 20 identifies among pixels 24 a first reference pixel $P_{r1}$, a second reference pixel $P_{r2}$, and k information pixels $P_{ik}$. Digits $A_{r1}$, $A_{r2}$, and $A_j$ are assigned to these pixels in that respective order.

In encoding grey scale data pixels 24 of SLM 18 can be set to many distinct light transmission levels with respect to signal beam 22. In particular, the discrete range of transmissivity for each pixel 24 should include at least as many levels as there are values for digits $A_j$. For example, if grey scale data $A_i$ is hexadecimal the transmissivity of each pixel 24 has to be adjustable to sixteen different transmissivity levels, each level corresponding to a different hexadecimal digit.

Figure 6:
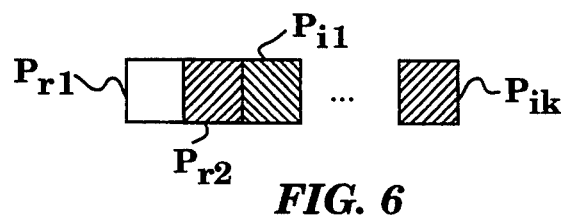
FIG. 6 is a schematic diagram illustrating the encoding of digital grey scale data according to the invention.

FIG. 6 shows a linear arrangement of pixels $P_{r1}$, $P_{r2}$, $P_{i1}$, ... $P_{ik}$ containing an encoded digit group $A_k$. The different hatchings indicate different transmissivity levels. In this case the highest transmissivity level corresponding to the largest digital value is left blank.

The storage process and other steps involved in impressing pixels $P_{r1}$, $P_{r2}$, $P_{i1}$, ... $P_{ik}$ on signal beam 22 are the same as above. Shuffling techniques and all other methods discussed above in reference to binary data storage can be used in storing grey scale data as well.

OPERATION—DECODING

To retrieve and decode binary data $B_i$ stored in medium 12 signal beam 22 is blocked or turned off. Next, angle of incidence β of reference beam 26 is adjusted to correspond to the particular holographic page $H_i$ where the desired data $B_i$ is encoded and stored.

When reference beam 26 illuminates medium 12 image beam 32 issues forth from output face 40 of medium 12. Image beam 32 contains pixels $P_r$, $P_{i1}$, $P_{i2}$, ... $P_{ik}$, i.e., k+1 pixels, for each encoded bit group $B_k$ stored on the selected holographic page $H_i$. In passing through optical unit 14 image beam 32 is shaped and projected onto CCD 34. Additionally, in a preferred decoding method each pixel 24 of SLM 18 corresponds to one pixel 36 of CCD 34. Thus a one-to-one relationship between pixels 24 and pixels 36 exists.

The decoding method of the invention is best illustrated on the smallest encoded bit group $B_k$ where k=1. Such bit group is represented by pixels $P_r$ and $P_{i1}$ previously encoded according to the method of the invention. In the preferred method stored pixels $P_r$ and $P_{i1}$ are imaged on CCD Decoding unit 38 is programmed to identify pixels $P_r$ and $P_{i1}$ among pixels 36 of CCD 34 and assign to them reference bit $B_r$ and information bit $B_j$. Moreover, decoding unit 38 assigns binary values to bits $B_r$ and $B_j$ corresponding to identified pixels $P_r$ and $P_{i1}$ based on the brightness of each pixel. In this embodiment decoding unit 38 assigns a binary one to reference bit $B_r$ when pixel $P_r$ is bright and a binary zero when pixel $P_r$ is dim. Similarly, a binary one is assigned to information bit $B_j$ when pixel $P_{i1}$ is bright and a binary zero when pixel $P_{i1}$ is dim.

Thus, bits $B_r$ and $B_j$ as encoded in unit 20 are reconstructed in decoding unit 38. Next, unit 38 compares the values of bits $B_r$ and $B_j$ to derive the original data bits $B_i$. Although many differentiation techniques can be employed for making such comparison, in the preferred method it is done by subtracting information bit $B_j$ from reference bit $B_r$ to obtain a differentiation result or a difference $D_j$. Difference $D_j$ can be either positive or negative. Positive difference $D_j$ is construed as a binary one and negative difference $D_j$ as a binary zero. Therefore, the left portion of FIG. 2 represents an encoded binary zero and the right portion represents a binary one. The value obtained represents the original bit $B_k$ taken from data bits $B_i$. Of course, with reverse coding the above subtraction has to be reversed to recover correct binary data.

Entire bit groups $B_k$ are decoded in the same manner. In each case the reference bit $B_r$ is used to construct differences $D_j = B_r - B_j$ whose sign gives the value of data bits $B_i$. If a particular bit group $B_k$ was stored in parts on different holographic pages $H_i$ then data from all these pages has to be retrieved to fully recover bit group $B_k$.

Decoding of digital grey scale data $A_i$ is performed in an analogous fashion. For each digit group $A_k$ decoding unit 38 identifies first reference pixel $P_{r1}$ containing first reference digit $A_{r1}$, and second reference pixel $P_{r2}$ containing second reference digit $A_{r2}$. Unit 38 also identifies information pixels $P_{i1}$, $P_{i2}$, ... $P_{ik}$ which contain information digits $A_j$. Then the first reference digit $A_{r1}$ is differentiated from second reference digit $A_{r2}$ to obtain a benchmark $D_r$. In the most preferred embodiment the differentiation operation is a subtraction. Thus, benchmark is computed as $D_r = A_{r2} - A_{r1}$.

Unit 38 then uses benchmark $D_r$ to perform a binary operation on on each information digit $A_j$. In the most preferred method this operation is multiplication. Consequently, the decoding process for each original grey scale data digit $A_i$ can be written mathematically as $A_i = D_r \times A_j$. Finally, the decoding process may be supplemented by adding an offset to either one of reference digits $A_{r1}$, $A_{r2}$, or to benchmark $D_r$. Such offset is used to compensate for any intensity fluctuations and renders the recovered data more reliable.

The above decoding and encoding methods can be extended to digit or bit groups containing special information. For example, the individual bit groups $B_k$ can contain error correction bits for subsequent error correction procedures. These error correction bits can be stored as described above. Moreover, the same method can be used to include encrypting bits or bits containing other types of information. Finally, it should be noted that the method of the invention permits storage of binary and other digital information in the same holographic medium and even side-by-side on the same holographic pages.

SUMMARY, RAMIFICATIONS, AND SCOPE

When dealing with holographic media the described method for encoding and decoding digital information in the form of bit or data groups is more reliable than direct storage. In fact, the bit error rates achieved with this method range from $10^{-6}$ all the way down to $10^{-12}$ at readout rates of $6.3 \times 10^6$ pixels per second. This is especially true in cases where error correction bits are incorporated into the stored data. These figures are sufficiently goof to permit storage of compressed video data. Since the encoding method of the invention is based on differentiation of individual pixels stored in a holographic medium, it is significantly less sensitive to time-dependent noise, page-to-page intensity fluctuations, region-to-region intensity fluctuations on the same page, and other phenomena which have prevented prior art methods from effectively storing digital data.

Furthermore, the capacity of holographic media is increased since more dense information storage is possible. Also, by incorporating error correction bits and/or digits the method of the invention permits use of error correction codes. Likewise, the method also lends itself to encrypting and other operations performed on digital data.

Therefore, the scope of the invention should be determined, not by examples given, but by the appended claims and their legal equivalents.

We claim:

1. A method of encoding binary data, said binary data comprising a total number i of data bits $B_i$, for storage in a holographic medium, said method comprising the following steps:
   a) identifying a bit group $B_k$ comprising a number k of said data bits $B_i$, said number k being at least equal to one and at most equal to said total number i;
   b) assigning to said bit group $B_k$ an encoded number k+1 of pixels belonging to a holographic signal generating means,
   c) selecting a reference pixel $P_r$ from among said pixels;
   d) assigning a reference bit $B_r$ to said reference pixel $P_r$; and
   e) encoding an information bit $B_j$ for each bit of said bit group $B_k$, thereby generating k information bits $B_j$ corresponding to each of said k bits comprising bit group $B_k$; and
   f) selecting information pixels $P_{i1}, P_{i2}, \ldots P_{ik}$ from among said pixels;
   g) assigning each information bits $B_j$ to one of said information pixels $P_{i1}, P_{i2}, \ldots P_{ik}$.

2. The method of claim 1 further comprising the steps of:
   a) activating said holographic signal generating means to illuminate said holographic medium with said reference pixel and information pixels $P_r, P_{i1}, P_{i2} \ldots P_{ik}$; and
   b) transmitting a reference beam to said holographic medium to store said reference pixel and said information pixels $P_r, P_{i1}, P_{i2} \ldots P_{ik}$ in said holographic medium.

3. The method of claim 1 wherein the encoding of data bit $B_i$ equal to zero comprises assigning to said reference bit $B_r$ a binary one and assigning to said information bit $B_j$ corresponding to data bit $B_i$ a binary zero, and the encoding of data bit $B_i$ equal to one comprises assigning to said reference bit $B_r$ a binary zero and assigning to said information bit $B_j$ corresponding to data bit $B_i$ a binary one.

4. The method of claim 1 wherein the encoding of data bit $B_i$ equal to zero comprises assigning to said reference bit $B_r$ a binary zero and assigning to said information bit $B_j$ corresponding to data bit $B_i$ a binary one, and the encoding of data bit $B_i$ equal to one comprises assigning to said reference bit $B_r$ a binary one and assigning to said information bit $B_j$ corresponding to data bit $B_i$ a binary zero.

5. The method of claim 1 wherein said holographic medium contains holographic pages $H_i$, each of said holographic pages $H_i$ comprising an array of pixels.

6. The method of claim 5 wherein said reference pixel and said information pixels $P_r, P_{i1}, P_{i2} \ldots P_{ik}$ are stored on one of said holographic pages $H_i$.

7. The method of claim 5 wherein said reference pixel and said information pixels $P_r, P_{i1}, P_{i2} \ldots P_{ik}$ are stored on different holographic pages chosen from said holographic pages $H_i$.

8. The method of claim 5 wherein said reference pixel and said information pixels $P_r, P_{i1}, P_{i2} \ldots P_{ik}$ are stored in a location of said array of pixels exhibiting substantially uniform light diffraction intensity.

9. The method of claim 1 further comprising reiterating steps a) to f) until all data bits $B_i$ are encoded.

10. The method of claim 1 wherein data bits $B_i$ contain error correction bits for performing error correction operations.

11. A method of decoding binary data stored in a holographic medium, said method comprising the following steps:
   a) illuminating said holographic medium with a reference beam to project binary data stored in said holographic medium on a projection means having a multiplicity of pixels;
   b) identifying on said projection means an encoded number k+1 of said multiplicity of pixels, said encoded number k+1 being at least equal to two, and said pixels comprising a reference pixel $P_r$ containing a reference bit $B_r$ and information pixels $P_{i1}, P_{i2}, \ldots P_{ik}$ containing information bits $B_j$;
   c) differentiating each information bit $B_j$ from said reference bit $B_r$ to obtain a differentiation result $D_j$; and
   d) assigning a data bit $B_i$ to each of said differentiation results $D_j$, said data bits $B_i$ comprising said decoded binary data.

12. The method of claim 11 wherein said differentiation comprises subtraction of each of said information bits from said reference bit, and said method further comprising the following steps:
   a) setting each of said data bits $B_i$ equal to a binary one when said differentiation result $D_j$ is positive; and
   b) setting each of said data bits $B_i$ equal to a binary zero when said differentiation result $D_j$ is negative.

13. The method of claim 11 wherein said differentiation comprises subtraction of each of said information bits from said reference bit, and said method further comprising the following steps:
   a) setting each of said data bits $B_i$ equal to a binary one when said differentiation result $D_j$ is negative; and
   b) setting each of said data bits $B_i$ equal to a binary zero when said differentiation result $D_j$ is positive.

14. The method of claim 11 wherein said holographic medium contains holographic pages $H_i$, each of said holographic pages $H_i$ comprising an array of pixels, and said reference pixel and said information pixels $P_r, P_{i1}, P_{i2}, \ldots P_{ik}$ are identified on different holographic pages $H_i$.

15. A method of encoding digital grey scale data, said digital grey scale data comprising a total number i of data digits $A_i$, for storage in a holographic medium, said method comprising the following steps:
   a) identifying a digit group $A_k$ comprising a number k of said data digits $A_i$, said number k being at least equal to one and at most equal to said total number i;
   b) assigning to said digit group $A_k$ an encoded number k+2 of pixels belonging to a holographic signal generating means;
   c) selecting a first reference pixel $P_{r1}$ and a second reference pixel $P_{r2}$ from among said pixels;
   d) assigning a first reference bit $A_{r1}$ to said first reference pixel $P_{r1}$ and assigning a second reference bit $A_{r2}$ to said second reference pixel $P_{r2}$;
   e) encoding an information digit $A_j$ for each digit of said digit group $A_k$, thereby generating k information digits $A_j$ corresponding to each of said k digits comprising digit group $A_k$; and f) selecting information pixels $P_{i1}, P_{i2}, \ldots P_{ik}$ from among said pixels;

g) assigning each information bits $A_j$ to one of said information pixels $P_{i1}, P_{i2}, \ldots P_{ik}$.

16. The method of claim 15 further comprising the steps of:

a) activating said holographic signal generating means to illuminate said holographic medium with said first reference pixel, said second reference pixels, and said information pixels $P_{r1}, P_{r2}, P_{i1}, P_{i2}, \ldots P_{ik}$; and b) transmitting a reference beam to said holographic medium to store said first reference pixel, said second reference pixel, and said information pixels $P_{r1}, P_{r2}, P_{i1}, P_{i2}, \ldots P_{ik}$ in said holographic medium.

17. The method of claim 15 wherein the encoding of data digit $A_i$ comprises:

a) assigning to said first reference digit $A_{r1}$ a lower limit for the value of data digit $A_i$;

b) assigning to said second reference digit $A_{r2}$ an upper limit for the value of data digit $A_i$; and c) equating said information digit $A_j$ to data digit.

18. The method of claim 15 wherein said holographic medium contains holographic pages $H_i$, each of said holographic pages $H_i$ comprising an array of pixels.

19. The method of claim 18 wherein said first reference pixel, said second reference pixel, and said information pixels $P_{r1}, P_{r2}, P_{i1}, P_{i2} \ldots P_{ik}$ are stored on one of said holographic pages $H_i$.

20. The method of claim 18 wherein said first reference pixel, said second reference pixel, and said information pixels $P_{r1}, P_{r2}, P_{i1}, P_{i2} \ldots P_{ik}$ are stored on different holographic pages chosen from said holographic pages $H_i$.

21. The method of claim 18 wherein said first reference pixel, said second reference pixel, and said information pixels $P_{r1}, P_{r2}, P_{i1}, P_{i2} \ldots P_{ik}$ are stored in a location of said array of pixels exhibiting substantially uniform light diffraction intensity.

22. The method of claim 15 further comprising reiterating steps a) to f) until all data digits $A_i$ are encoded.

23. The method of claim 15 wherein data digits $A_i$ contain error correction digits for performing error correction operations.

24. A method of decoding digital grey scale data $A_i$ stored in a holographic medium, said method comprising the following steps:

a) illuminating said holographic medium with a reference beam to project said digital grey scale data stored in said holographic medium on a projection means having a multiplicity of pixels, b) identifying on said projection means an encoded number $k+2$ of said multiplicity of pixels, said encoded number $k+2$ being equal to at least three, said pixels comprising a first reference pixel $P_{r1}$ containing a first reference digit $A_{r1}$, a second reference pixel $P_{r2}$ containing a second reference digit $A_{r2}$, and information pixels $P_{i1}, P_{i2}, \ldots P_{ik}$ comprising information digits $A_j$;

c) differentiating said first reference digit $A_{r1}$ from said second reference digit $A_{r2}$ to obtain a benchmark $D_r$; and d) performing a binary operation on said benchmark $D_r$ and each of said information digits $A_j$ to obtain decoded data digits $A_i$ comprising said digital grey scale data.

25. The method of claim 24 wherein reference digits $A_{r1}, A_{r2}$ and said benchmark $D_r$ are each supplemented by an offset.

26. The method of claim 24 wherein said holographic medium is subdivided into holographic pages $H_i$, each of said holographic pages $H_i$ comprising an array of pixels, and said first reference pixel, said second reference pixel, and said information pixels $P_r, P_{i1}, P_{i2}, \ldots P_{ik}$ are identified on different holographic pages $H_i$.

27. The method of claim 24 wherein said differentiating step comprises subtraction and said binary operation is multiplication.

* * * * *